(12) United States Patent
Mizata

(10) Patent No.: US 8,371,635 B2
(45) Date of Patent: Feb. 12, 2013

(54) DASHBOARD INSULATOR FOR MOTOR VEHICLES AND MANUFACTURING METHOD THEREFOR

(75) Inventor: Shuichi Mizata, Niwa-gun (JP)

(73) Assignee: Howa Textile Industry Co., Ltd., Kasugai (JP)

( * ) Notice: Subject to any disclaimer, the term of this patent is extended or adjusted under 35 U.S.C. 154(b) by 26 days.

(21) Appl. No.: 13/060,833

(22) PCT Filed: Sep. 25, 2009

(86) PCT No.: PCT/JP2009/004841
§ 371 (c)(1),
(2), (4) Date: Feb. 25, 2011

(87) PCT Pub. No.: WO2010/035467
PCT Pub. Date: Apr. 1, 2010

(65) Prior Publication Data
US 2011/0221223 A1    Sep. 15, 2011

(30) Foreign Application Priority Data
Sep. 26, 2008   (JP) .................................. 2008-247211

(51) Int. Cl.
*B62D 25/14* (2006.01)
*B29C 65/02* (2006.01)
(52) U.S. Cl. ..................................... 296/39.3; 156/307.1
(58) Field of Classification Search ................. 296/39.3, 296/193.07, 70, 193.04, 97.23, 72, 73; 180/290, 180/240, 288; 428/77, 95; *B62D 25/14; B29C 65/02*
See application file for complete search history.

(56) References Cited

U.S. PATENT DOCUMENTS

| 4,243,456 | A | * | 1/1981 | Cesano | 156/214 |
| 5,554,831 | A | * | 9/1996 | Matsukawa et al. | 181/294 |
| 5,817,408 | A | * | 10/1998 | Orimo et al. | 428/218 |
| 6,102,465 | A | * | 8/2000 | Nemoto et al. | 296/39.3 |
| 6,673,412 | B2 | * | 1/2004 | Ramesh et al. | 428/77 |
| 6,685,250 | B2 | * | 2/2004 | Misaji et al. | 296/39.3 |
| 7,017,250 | B2 | * | 3/2006 | Gebreselassie et al. | 29/428 |

(Continued)

FOREIGN PATENT DOCUMENTS

| JP | A-9-119177 | 5/1997 |
| JP | A-2001-347900 | 12/2001 |

(Continued)

OTHER PUBLICATIONS

International Search Report issued in International Application No. PCT/JP2009/004841 on Jan. 12, 2010 (with translation).

(Continued)

*Primary Examiner* — Glenn Dayoan
*Assistant Examiner* — Sunsurraye Westbrook
(74) *Attorney, Agent, or Firm* — Oliff & Berridge, PLC

(57) ABSTRACT

In a dashboard insulator for a vehicle, an inner layer laminated between front and rear layers is formed by laminating fusion, barrier and other fusion films and has a large number of small holes with a uniform opening rate. The both layers are formed by a thermoplastic material with predetermined basis weight, and Young's modulus. The both fusion films formed by a thermoplastic material with a melting point lower than that of the barrier film fuse the both layers to the barrier film. Each fusion part of the both fusion films has a predetermined fusion force in its predetermined range.

4 Claims, 5 Drawing Sheets

U.S. PATENT DOCUMENTS

| | | | |
|---|---|---|---|
| 7,201,253 B2 * | 4/2007 | Duval et al. | 181/204 |
| 7,238,407 B2 * | 7/2007 | Wesch et al. | 428/138 |
| 7,789,196 B2 * | 9/2010 | Fukuhara et al. | 181/286 |
| 2005/0126848 A1 * | 6/2005 | Siavoshai et al. | 181/207 |

FOREIGN PATENT DOCUMENTS

| | | |
|---|---|---|
| JP | A-2005-227747 | 8/2005 |
| JP | A-2006-137160 | 6/2006 |
| JP | A-2007-22183 | 2/2007 |
| JP | A-2008-155775 | 7/2008 |

OTHER PUBLICATIONS

Feb. 14, 2012 Office Action issued in European Patent Application No. 1104471.6.

Jun. 12, 2012 Office Action issued in European Patent Application No. 1104471.6.

* cited by examiner

DASHBOARD INSULATOR FOR MOTOR VEHICLES AND MANUFACTURING METHOD THEREFOR

BACKGROUND OF THE INVENTION

1. Field of the Invention

The present invention relates to a dashboard insulator for a motor vehicle suitable for reduction of a noise generated in a compartment of the motor vehicle by propagation into the compartment and a manufacturing method therefor.

2. Description of the Related Art

As this type of the dashboard insulator, a soundproof material for a motor vehicle described in Japanese Patent Laid-Open Publication No. 2001-347900 is proposed. The soundproof material is constructed by layering a first sound absorption layer of air permeability, a resin layer of air impermeability, and a second sound absorption Layer of air permeability sequentially.

The soundproof material thus constructed is disposed along a dash panel which separates the compartment from an engine room of the motor vehicle. Herein, in the soundproof material, the first sound absorption layer of air permeability is disposed so as to be located inside the compartment for absorbing noises in the compartment, while the second sound absorption layer of air permeability is disposed so as to be located inside the engine room for absorbing noises from the engine room. Also, the resin layer of air impermeability is laminated between the first and second sound absorption layers of air permeability so as to be located opposing against the engine room by way of the second sound absorption layer of air permeability thereby to insulate propagation of the noises from the engine room to the compartment.

In the soundproof material as constructed above, the first and second sound absorption layers have permeability respectively. However, the resin layer of air impermeability does not have air permeability at all.

Therefore, even though the resin layer of air impermeability insulates the noises from the engine room to the compartment through the first sound absorption layer of air permeability, the resin layer of air impermeability exerts a sound insulating function also against the noises into the compartment from the outside thereof. In other words, because the soundproof material includes the resin layer of air impermeability, it is difficult that the soundproof material absorbs the noises generated in the compartment due to propagation into the compartment from the outside thereof, even if the noises may be reflected by the above-mentioned sound insulating function within the compartment.

SUMMARY OF THE INVENTION

It is therefore an object of the present invention to provide a dashboard insulator for a motor vehicle capable of favorably exerting silence by sound absorbency and the like to the noise in the compartment.

It is another object of the present invention is to provide a manufacturing method of the dashboard insulator for the motor vehicle.

In order to solve these objects, in accordance with the present invention there is provided a dashboard insulator for a motor vehicle, comprising:

first and second outer layers formed by a porous material and located opposing to each other; and at least one inner layer laminated between said first and second outer layers and including a barrier film and first and second fusion films laminated to said barrier film from both faces of said barrier film respectively so that said first and second outer layers are fusioned to the barrier film, wherein said porous material forming one of said first and second outer layers has a basis weight within a range of 100 ($g/m^2$) to 1,600 ($g/m^2$), and said porous material forming the other of said first and second outer layers has a basis weight within a range of 100 ($g/m^2$) to 1,600 ($g/m^2$) and Young's modulus within a range of 50,000 ($N/m^2$) to 300,000 ($N/m^2$);

said inner layer has a thickness within a range of 25 ($\mu m$) to 80 ($\mu m$), said inner layer forming penetratingly thereto a large number of small holes at a uniform opening rate within a range of 0.5(%) to 5(%);

a fusion part by said first fusion film between said first outer layer and said barrier film has a fusion force within a range of 5 (N/5 cm) to 20 (N/5 cm) at its portion equal to or more than 50(%); and a fusion part by said second fusion film between said second outer layer and said barrier film has a fusion force within a range of 5 (N/5 cm) to 20 (N/5 cm) at its portion equal to or more than 50(%).

As is described above, the dashboard insulator is formed by the first and second outer layers and at least one inner layer laminated between the first and second outer layers as a layer structure.

Accordingly, for mounting the dashboard insulator of the layer structure on a dashboard assembled to a boundary between an engine room of the motor vehicle and a compartment thereof, the dashboard insulator is mounted on the dashboard from the compartment side of the motor vehicle at one of the first and second outer layers. Therefore, the dashboard insulator is faced to the inside of the compartment at the other of the first and second outer layers.

Herein, the porous material forming the other of the first and second outer layers has the basis weight within the range of 100 ($g/m^2$) to 1,600 ($g/m^2$) and also has Young's modulus within the range of 50,000 ($N/m^2$) to 300,000 ($N/m^2$). Thus, the other of the first and second outer layers is capable of exerting favorable sound absorption properties based on a gravity corresponding to the above basis weight. And also, the other of the first and second outer layers is capable of exerting favorable sound absorption properties on the basis of flexibility corresponding to the above Young's modulus.

As the result, the other of the first and second outer layers can exert more favorable sound absorption properties on the basis of a synergetic action of both of the above basis weight and the above Young's modulus.

Also, the inner layer is thinly formed at a thickness within the range of 25 ($\mu m$) to 80 ($\mu m$), and the large number of small holes with the uniform opening rate within the range of 0.5 (%) to 5(%) are formed to the inner layer penetratingly. Thus, the inner layer is capable of exerting favorable sound absorption properties on the basis of both of the thinness and the large number of small holes as described above.

Moreover, the fusion part by the first fusion film between the first outer layer and the barrier film has the fusion force within the range of 5 (N/5 cm) to 20 (N/5 cm) at its portion equal to or more than 50(%), and the fusion part by the second fusion film between the second outer layer and the barrier film has the fusion force within the range of 5 (N/5 cm) to 20 (N/5 cm) at its portion equal to or more than 50(%). Thus, these fusion forces are helpful in exerting favorable sound absorption properties at the inner layer.

Under the above-mentioned sound absorption properties, even if noises are generated in the compartment due to propagation into the compartment, the noises can be favorably absorbed by the other of the first and second outer layers on the basis of the synergetic action of both of the basis weight and the Young's modulus of the porous material as described above.

And also, even if a part of the noises is transmitted through the other of the first and second outer layers, the part of the noises transmitted as above can be favorably absorbed by being transmitted through the large number of small holes of the inner layer due to the thinness of the inner layer.

Herein, since the small holes of the large number are uniformly formed over the entire face of the inner layer at the above-described uniform opening rate, the part of the noises can be favorably absorbed by being transmitted through all the large number of small holes of the inner layer.

Also, even if there remains a part of the noises which are not absorbed by the inner layer, such a part of the noises can be favorably absorbed by one of the first and second outer layers on the basis of synergetic sound absorption properties on the basis of the basis weight within the range of 100 ($g/m^2$) to 1,600 ($g/m^2$) and young's modulus within the range of 50,000 ($N/m^2$) to 300,000 ($N/m^2$) of the porous material.

By going through the sound absorption process as is described above, the noises in the compartment can be favorably absorbed by the dashboard insulator almost without reflection to the inside of the compartment.

On the other hand, even if engine noises are generated in the engine room, these engine noises can be favorably absorbed by one of the first and second outer layers on the basis of the basis weight within the range of 100 ($g/m^2$) to 1,600 ($g/m^2$) of the forming material. Therefore, propagation of the engine noises into the compartment can be favorably insulated by the dashboard insulator.

As the result of the above descriptions, can be provided the dashboard insulator for the motor vehicle which is capable of favorably insulating the engine noises from the inside of the compartment and also of favorably exerting sound absorption properties to the noises generated in the compartment due to propagation thereof into the compartment. Additionally, the first and second outer layers are extremely light in weight, since the basis weight of the porous material forming the first and second outer layers is within the range of 100 ($g/m^2$) to 1,600 ($g/m^2$). Moreover, the inner layer is formed thinly as described above. Thus, the dashboard insulator may be helpful to improvement of fuel costs of the motor vehicle and so on because the dashboard insulator is extremely light in weight.

According to an aspect of the present invention, said porous material forming said first and second outer layers is a fibrous structure body material or a porous synthetic resin material;

said barrier film of said inner layer is formed by a thermoplastic resin material;

said first fusion film of said inner layer is formed by a thermoplastic resin material with a melting point lower than that of said thermoplastic resin material forming said barrier film; and said second fusion film of said inner layer is formed by a thermoplastic resin material with a melting point lower than that of said thermoplastic resin material forming said barrier film.

As is described above, the first and second fusion films are formed by the thermoplastic material with a melting point lower than that of the above thermoplastic resin material forming the barrier film. Thus, the fusion of the first outer layer with the barrier film by the first fusion film can be favorably accomplished so as to ensure the above fusion force without fusion of the barrier film, and the fusion of the second outer layer with the barrier film by the second fusion film can be favorably accomplished so as to ensure the above fusion force without fusion of the barrier film.

As the result, the operation and effect of the present invention can be achieved further reliably, based on the first and second outer layers formed by the fibrous structural body material or the porous synthetic resin material.

According to another aspect of the present invention, said fibrous structure body material forming said first and second outer layers is felt made of polyethyleneterephthalate, cotton or wool;

said thermoplastic resin material forming said barrier film is nylon or polyester;

said thermoplastic resin material forming said first fusion film is polyethylene or polypropylene; and said thermoplastic resin material forming said second fusion film is polyethylene or polypropylene.

Accordingly, the operation and effect of the present invention can be achieved further specifically.

According further to the present invention, there is provided a manufacturing method of a dashboard insulator for a motor vehicle, comprising the steps of:

an outer layer forming step for forming one of first and second outer layers by a porous material having a basis weight within a range of 100 ($g/m^2$) to 1,600 ($g/m^2$) and forming the other of said first and second outer layers by a porous material having a basis weight within a range of 100 ($g/m^2$) to 1,600 ($g/m^2$) and Young's modulus within a range of 50,000 ($N/m^2$) to 300,000 ($N/m^2$);

an inner layer forming step for forming a first cylindrical film for a barrier film, a second cylindrical film for a first fusion film containing said first cylindrical film and a third cylindrical film for a second fusion film contained by said first cylindrical film respectively by a first thermoplastic resin material in a molten state, a second thermoplastic resin material in a molten state and with a melting point lower than that of the first thermoplastic resin material and a third thermoplastic resin material in a molten state and with a melting point lower than that of the first thermoplastic resin material by using a multi-layer inflation molding machine, thereafter cooling and bonding said second, first and third cylindrical films to form a single cylindrical film of a thickness within a range of 25 (μm) to 80 (μm), forming a sheet-like film from said single cylindrical film, and forming a large number of small holes to said sheet-like film at a uniform opening rate within a range of 0.5(%) to 5(%) thereby to form said inner layer constructed by said first fusion film, said barrier film and said second fusion film; and a fusion step for interposing said inner layer between said first and second outer layers in a laminated state to constitute a three-layered layer body, and heating said three-layered layer body at a temperature between the melting point of the first thermoplastic material and each melting point of the second and third thermoplastic materials so that said first and second fusion films are melted and pressurized and thereafter are cooled so as to fuse said first and second outer layers to said barrier film from both faces thereof by said first and second fusion films, wherein for fusing said first and second outer layers to said barrier film from the both faces thereof in said fusion step, said pressurization is performed so that a fusion part by said first fusion film between said first outer layer and said barrier film has a fusion force within a range of 5 (N/5 cm) to 20 (N/5 cm) at its portion equal to or more than 50(%), and a fusion part by said second fusion film between said second outer layer and said barrier film has a fusion force within a range of 5 (N/5 cm) to 20 (N/5 cm) at its portion equal to or more than 50(%).

According to the above descriptions, at the fusion step, the first and second fusion films are melted and thereafter fuse the first and second outer layers to the barrier film from both faces thereof.

Thus, for bonding the first and second outer layers to the barrier film, the inner layer is capable of making the first and second fusion films act also as an adhesive without a step for applying an adhesive and of exerting the same sound absorption properties as that of the barrier film.

As a result, an excess step of coating an adhesive which is needed for bonding the first and second outer layers to the barrier film can be excluded from the manufacturing step of the dashboard insulator, and manufacture of the dashboard insulator for a motor vehicle which can achieve the above-described operation and effect of the present invention is made possible.

BRIEF DESCRIPTION OF THE DRAWINGS

Other features and advantages of the invention will be apparent from the following description taken in connection with the accompanying drawings, wherein.

DETAILED DESCRIPTION OF THE PREFERRED EMBODIMENT

Figure 1:
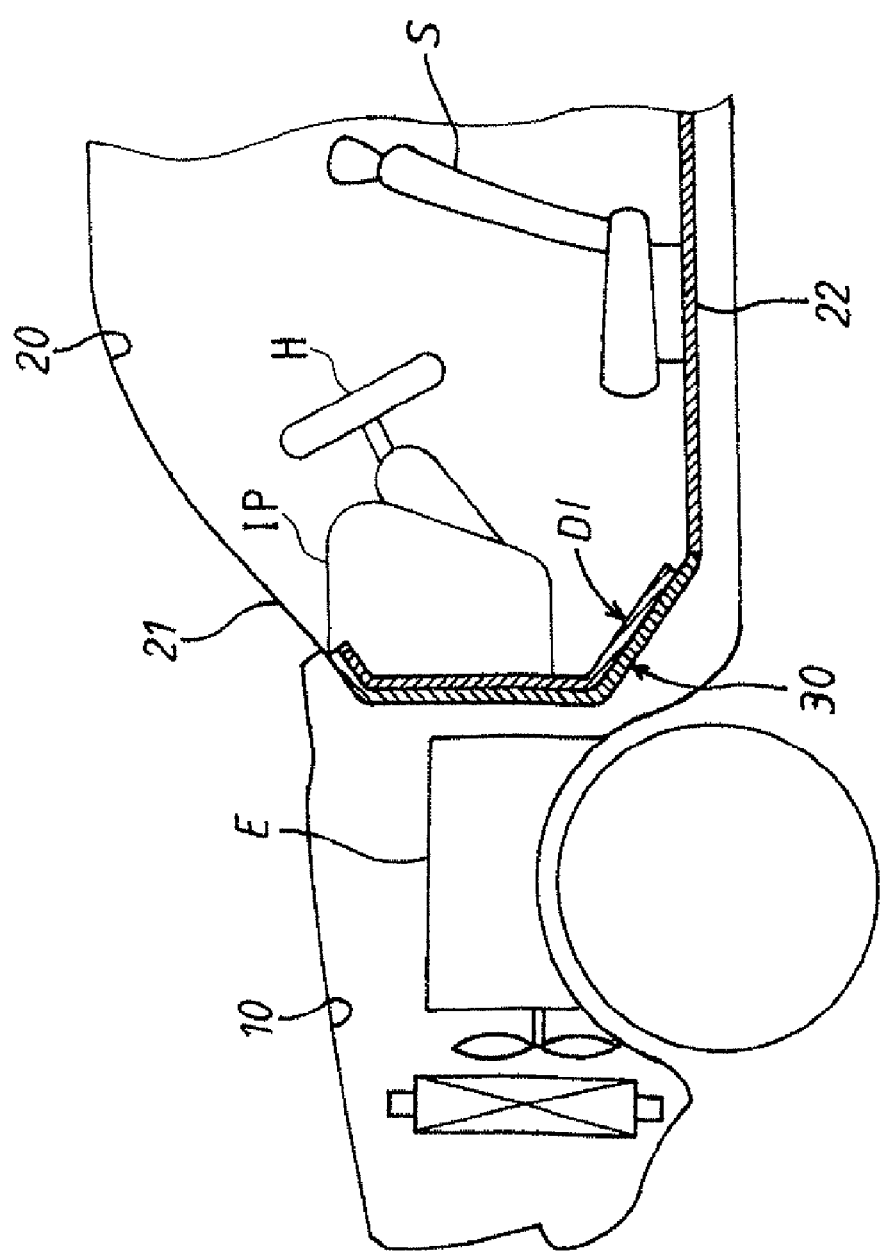
FIG. 1 is a schematic partial outline side view of a motor vehicle to which an embodiment of a dashboard insulator according to the present invention is applied.

Hereinafter an embodiment of the present invention will be described below, referring to the attached drawings. FIG. 1 shows an embodiment of the present invention which is applied to a motor vehicle or an automotive vehicle of a sedan-type. This motor vehicle is provided with an engine room 10 and with a compartment 20. The vehicle compartment 20 is disposed subsequently to the engine room 10 in the motor vehicle. In the engine room 10, an engine E is disposed. And, in the compartment 20, disposed are a steering wheel H, an instrument panel IP and a driver seat S.

This motor vehicle is also provided with a dashboard 30 (or a dash panel 30). The dashboard 30 is, as shown in a longitudinal sectional shape in FIG. 1, formed by being extended so as to slantingly bend the upper and lower side portions thereof toward the rearward direction upwardly and downwardly from the center portion thereof. The dashboard 30 constructed as above is disposed on a boundary between the engine room 10 and the compartment 20 thereby to divide the engine room 10 and the compartment 20 from each other. The dashboard 30 is coupled to a lower edge portion of a front windshield 21 of the compartment 20 at its extended upper end portion. An extended lower end portion of the dashboard 30 is coupled to a front edge portion of a floor wall 22 of the compartment 20.

The motor vehicle is further provided with a dashboard insulator DI (or a dash insulator DI) which is, as shown in FIG. 1, assembled on the dashboard 30 along this dashboard 30 from the side of the compartment 20. The dashboard insulator DI is, as shown in FIG. 2, formed by a front layer 40, an inner layer 50 and a rear layer 60 which are laminated sequentially from the front side to the rear side of the motor vehicle.

Figure 2:
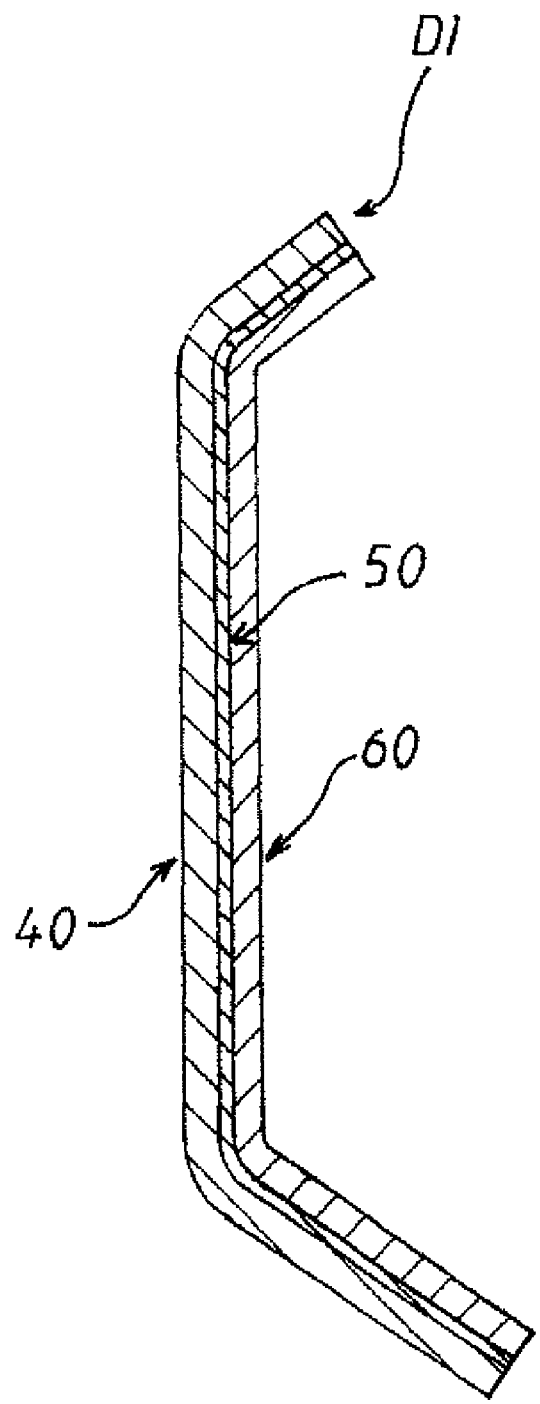
FIG. 2 is an enlarged longitudinal sectional view of the dashboard insulator in FIG. 1.

The front layer 40 is, as shown in the longitudinal sectional shape in FIG. 2, formed by a predetermined porous material for the front layer with a predetermined thickness so as to slantingly bend and extend both upper and lower side portions thereof toward the rearward direction upwardly and downwardly from a central portion thereof. Thus, the front layer 40 is assembled at its front face on the dashboard 30 along the rear face thereof.

In the embodiment, the above-described predetermined thickness of the front layer 40 is determined to be 20 (mm). Also, as the above-described predetermined porous material for the front layer, adopted is felt which is made of polyethyleneterephthalate (hereinafter referred to as PET) and has a predetermined Young's modulus and a predetermined basis weight (weight or yield per unit area). The felt is hereinafter called as PET felt for the front layer. Herein, the predetermined basis weight of the PET felt for the front layer is 1,000 (g/m$^2$).

Figure 3:
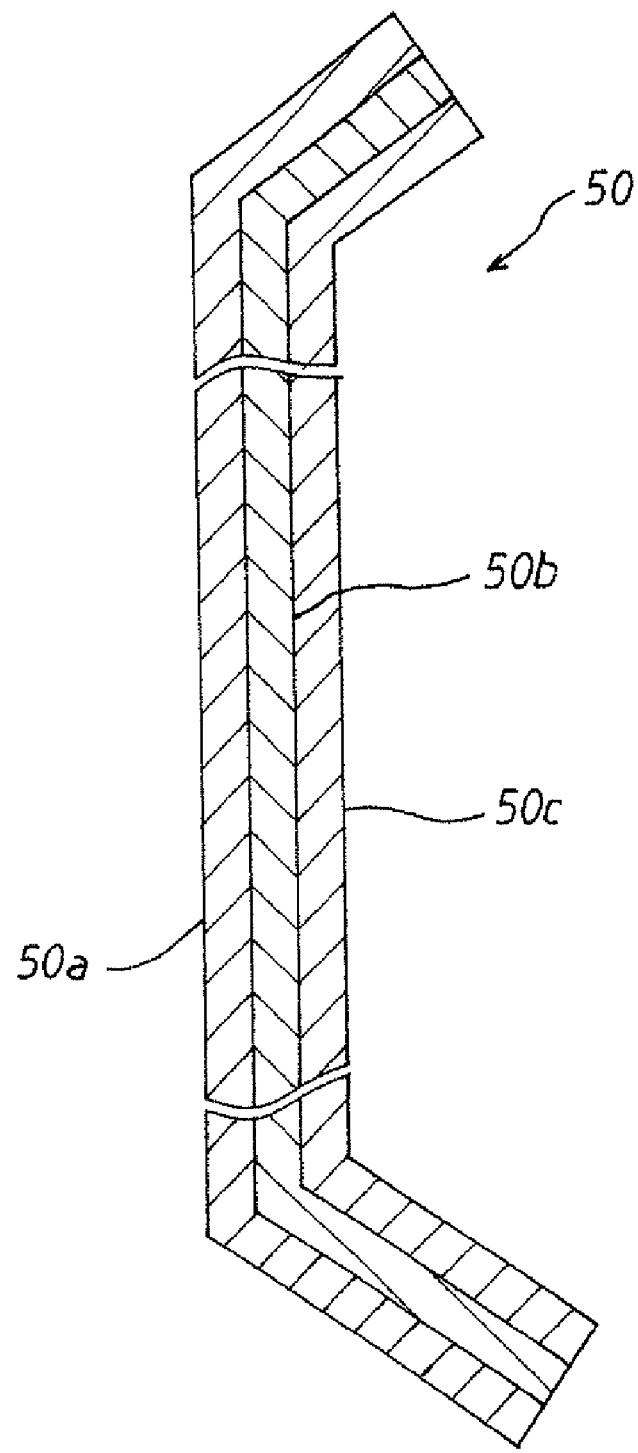
FIG. 3 is an enlarged longitudinal sectional view of an inner layer in FIG. 2.

The inner layer 50 is, as shown in FIG. 3, formed by layering one side fusion film 50a, a barrier film 50b and the other side fusion film 50c. The one side fusion film 50a is, as shown in the longitudinal sectional shape in FIG. 3, formed by a predetermined thermoplastic material for the one side fusion film with a predetermined thickness so as to slantingly bend and extend the both upper and lower side portions thereof upwardly and downwardly toward the rearward direction from the center part thereof. The one side fusion film 50a is fusioned (or fused and bonded) at its front face to the front layer 40 along the rear face thereof.

In this embodiment, the above-described predetermined thickness of the one side fusion film 50a is determined to be 20 (μm). Also, as the above-described predetermined thermoplastic material for the one side fusion film, polyethylene is adopted.

The barrier film 50b is, as shown in the longitudinal sectional shape in FIG. 3, formed by a predetermined thermoplastic material for the barrier film with a predetermined thickness so as to slantingly bend and extend the both upper and lower side portions thereof upwardly and downwardly toward the rearward direction from the center part thereof. And, the front layer 40 is fusioned by the one side fusion film 50a to the barrier film 50b from the front face thereof.

In the embodiment, the above-described predetermined thickness of the barrier film 50b is determined to be 15 (μm). Also, as the above-described predetermined thermoplastic material for the barrier film, nylon is adopted, because nylon has a melting point higher than that of polyethylene which is a forming material of the above-described one side fusion film 50a.

The other fusion film 50c is formed by a predetermined thermoplastic material for the other side fusion film at the same predetermined thickness 20 (μm) as the thickness of the one side fusion film 50a so as to have the same longitudinal sectional shape as that of the one side fusion film 50a. Thus, this other side fusion film 50c is fusioned by its front face to the barrier film 50b along the rear face thereof. In addition, as the thermoplastic material for the above-described predetermined other side fusion film, polyethylene is adopted, similarly to the predetermined thermoplastic material for the above-described one side fusion film. Also, the thickness of the inner layer 50 is equal to the total sum 55 (μm) of thicknesses of the one side fusion film 50a, the barrier film 50b, and the other side fusion film 50c.

Also, in the embodiment, a large number of small holes (not shown) of the inner layer 50 are formed penetratingly to the inner layer 50 over the entire face thereof at a predetermined diameter (for example, 5 (mm)) and a predetermined opening pitch (for example, 30 (mm)) from the front face of the one side fusion film 50a to the rear face of the other side fusion film 50c.

Accordingly, the large number of small holes are formed penetratingly at a predetermined uniform opening rate 2(%) in the inner layer 50. In addition, the above opening pitch refers to a central distance of each of the both adjacent small holes.

The rear layer 60 is, as shown in the longitudinal sectional shape in FIG. 2, formed by a predetermined porous material for the rear layer with a predetermined thickness so as to slantingly bend and extend the both upper and lower side portions thereof upwardly and downwardly toward the rearward direction from the center part thereof. And the rear layer 60 is fusioned by the other side fusion film 50c of the inner layer 50 to the barrier film 50b from the rear face thereof.

In the embodiment, the above-described predetermined thickness of the rear layer 60 is determined to be 3 (mm), differing from that of the front layer 40. Also, as the above-described predetermined porous material for the rear layer, adopted is felt which is made of polyethyleneterephthalate and has a predetermined Young's modulus and a predetermined basis weight. Additionally, hereinafter the felt is referred as PET felt for the rear layer.

Herein, the predetermined Young's modulus of the PET felt for the rear layer is 280,000 ($N/m^2$), but the predetermined basis weight of the PET felt for the rear layer is 400 ($g/m^2$), differing from that of the PET felt for the front layer.

Next, the dashboard insulator DI constructed as is described above is manufactured as in the followings.

Firstly, the above-described PET felt for the front layer is cut so as to have an outline dimension, which conforms to the outline dimension of the dashboard 30, thereby to be prepared as the front layer 40 with a thickness of 20 (mm). Also, the above-described PET felt for the rear layer is cut so as to have an outline dimension, which conforms to the outline dimension of the dashboard 30, thereby to be prepared as the rear layer 60 with a thickness of 3 (mm).

Subsequently, the inner layer 50 is prepared by using a multi-layer inflation molding machine, as in the followings.

In the multi-layer inflation molding machine, when molten polyethylene for the one side fusion film, molten nylon for the barrier film and molten polyethylene for the other side fusion film are extruded upward by a plurality of extruders (three extruders in the embodiment), the molten polyethylene for the one side fusion film, the molten nylon for the barrier film and the molten polyethylene for the other side fusion film are inflated together by an air flow and formed into a cylindrical film shape.

At this time, the cylindrical film made of the molten polyethylene for the one side fusion film contains the cylindrical film made of the molten nylon for the barrier film, and this cylindrical film made of the molten nylon for the barrier film contains the cylindrical film made of the molten polyethylene for the other side fusion film so as to form the three-layered cylindrical film body.

Then, the three-layered cylindrical film body which is formed as is described above is cooled as it is and bonded to each other in the multi-layer inflation molding machine thereby to become a single cylindrical film which is made of the polyethylene film for the one side fusion film, the nylon film for the barrier film and the polyethylene film for the other side fusion film.

After the single cylindrical film is formed as is described above, the single cylindrical film is cut in the axial direction to form a sheet-shaped film, and then a large number of small holes are formed by a punching device (not shown) to the sheet-shaped film.

Herein, the punching device is provided with a punching roller which is supported rotatably. And, a large number of needle-shaped projections are extended from an outer surface of the punching roller at a pitch corresponding to the predetermined opening pitch (30 (mm)) of the above-described small holes of the inner layer 50. In addition, an outer diameter of a base portion of each of the needle-shaped projections is equal to the diameter of the above-described small hole (5 (mm)) of the inner layer 50.

Then, with the above-mentioned punching device, a large number of the needle-shaped projections are penetrated to the above-mentioned sheet-shaped film, and the punching roller presses at its outer surface the above-mentioned sheet-shaped film and is rotated. Thus, a large number of small holes are formed in the above-described sheet-shaped film at a uniform opening rate 2(%).

As the result, the sheet-shaped film is formed as the above-described inner layer 50 which is constructed by the one side fusion film 50a, the barrier film 50b and the other side fusion film 50c. Additionally, Even if a large number of the small holes are formed in the sheet-like film as is described above, a large number of the small holes are not clogged since the sheet-like film is extremely thin.

The inner layer 50 which is formed as is described above is interposed and laminated between the front layer 40 and the rear layer 60, which are prepared as is described above, to constitute the three-layer lamination body, and then the three-layer lamination body is installed in a heating device (not shown). Thereafter, hot blast is blown at a temperature of 170(° C.) in the heating device, to the three-layer lamination body, thereby to heat this three-layer lamination body for a predetermined heating time (for instance, 1 minute).

Accordingly, the one side fusion film 50a and the other side fusion film 50c of the three-layer lamination body are melted. At this time, the melting point of polyethylene, which is a forming material each of the one side fusion film 50a and the other side fusion film 50c is lower than the above-described temperature of 170(° C.), and the melting point of nylon, which is a forming material of the barrier film 50b is higher than the above-described temperature of 170(° C.). Thus, the barrier film 50b is not melted, even if the one side fusion film 50a and the other side fusion film 50c are melted.

Subsequently, the three-layer lamination body formed by melting only the one side fusion film 50a and the other side fusion film 50c, as is described above is installed in a die for cold forming of a cold forming device (not shown). Herein, the die for cold forming provided in the cold forming device has an upper die and a lower die which are joined at respective forming faces thereof thereby to be constructed so as to form an accommodation space for installing the above-described three-layer lamination body. Also, the upper die is constituted by including a cooling-water pipe therein in order to supply cooling water into the above-mentioned accommodation space.

Then, the three-layer lamination body which is formed by melting only the one side fusion film 50a and the other side fusion film 50c as is described above is installed in the accommodation space of the die, and the cooling water is supplied into the accommodation space by the cooling-water pipe through the upper die. Accordingly, the three-layer lamination body is pressurized by the die in the accommodation space and cooled by water to be molded. As a result, the front layer 40 and the rear layer 60 are fusioned to the barrier film 50b from the both faces thereof respectively by the one side fusion film 50a and the other side fusion film 50c in accordance with respective changes of the one and other side fusion films 50a and 50c from the molten state to solidification.

In this case, for realizing such fusion, the pressurizing force is applied to the three-layer lamination body by the above-mentioned die as follows. Namely, the pressurizing force is applied to the three-layer lamination body by the above-mentioned die so that each part of the front layer 40 and the barrier film 50b which is fusioned by the one side fusion film 50a at a fusing force of 15 (N/5 cm) occupies a portion equal to or more than 50(%) and that each part of the rear layer 60 and the barrier film 50b which is fusioned by the other side fusion film 50c at a fusing force of 10 (N/5 cm) occupies a portion equal to or more than 50(%).

By way of the above-mentioned process, the manufacture of the dashboard insulator DI is finished. Then, in the fusion process of the manufacturing process, as is described above, the one side fusion film 50a and the other side fusion film 50c are melted and thereafter the front layer 40 and the rear layer 60 are fusioned and bonded by the one side fusion film 50a and the other side fusion film 50c to the barrier film 50b at its both faces.

Therefore, For bonding the front layer 40 and the rear layer 60 to the barrier film 50b, the one side fusion film 50a and the other side fusion film 50c act also as an adhesive without the process of applying the adhesive in the inner layer 50 may exert the sound absorption properties similar to that of the barrier film 50b.

As a result, the working process of applying an adhesive required for bonding the front layer 40 and the rear layer 60 to the barrier film 50b may be eliminated.

Also, the dashboard insulator DI which is manufactured as is described above is formed as the three-layer lamination structure which is constructed by the front layer 40, the rear layer 60 and the inner layer 50 interposed between these front and rear layers 40, 60. And, the dashboard insulator DI is attached to the dashboard 30 at the front layer 40, as is described above, thereby to face the inside of the compartment 20 at the rear layer 60.

Herein, the PET felt for the front layer forming the front layer 40 has the basis weight of 1,000 (g/m$^2$) as is described above. Thus, the front layer 40 can exert favorable sound absorption properties on the basis of the weight corresponding to the above basis weight of 1,000 (g/m$^2$). And the front layer 40 can also exert favorable sound absorption properties on the basis of flexibility corresponding to the above Young's modulus.

Therefore, the front layer 40 can exert favorable sound absorption properties on the basis of the synergic action of both the above basis weight and the above Young's modulus. In addition, the basis weight of the PET felt for the front layer is determined to be a weight corresponding to the magnitude of noises which are sounds of the engine E (hereinafter referred to as engine sounds).

On the other hand, the PET felt for the rear layer forming the rear layer 60 has the basis weight of 400 (g/m$^2$) and the Young's modulus of 280,000 (N/m$^2$), as is described above. Thus, the rear layer 60 can exert favorable sound absorption properties on the basis of the weight corresponding to the above basis weight of the PET felt for the rear layer and can also exert favorable sound absorption properties on the basis of flexibility corresponding to the above Young's modulus of the PET felt for the rear layer.

Therefore, the rear layer 60 can exert favorable sound absorption properties based on the synergic action of both the above basis weight and the above Young's modulus of the PET felt for the rear layer. In addition, the basis weight of the PET felt for the rear layer is determined to be half of the basis weight of the PET felt for the front layer, because noises generated in the compartment 20 are usually smaller than the engine noises in the embodiment.

Also, the inner layer 50 is thinly formed at the thickness of 55 (μm), and a large number of the small holes are formed penetratingly at the uniform opening rate of 2(%) (the diameter of the small hole: 5 (mm), the opening pitch of the small holes: 30 (mm)). Thus, the inner layer can exert favorable sound absorption properties on the basis of the synergic action of both the thinness and a large number of the small holes.

Moreover, each fusion part of the front layer 40 and the barrier film 50b by way of the one side fusion film 50a has the fusion force equal to or less than 20 (N/5 cm) at its portion equal to or more than 50(%), and each fusion part of the rear layer 60 and the barrier film 50b by way of the other side fusion film 50c has the fusion force equal to or less than 20 (N/5 cm) at its portion equal to or more than 50(%). These fusion forces are helpful in exerting favorable sound absorption properties in the inner layer 50.

Thus, with the sound absorption properties as is described above, even if noises are generated as interior noises in the compartment 20 due to propagation into the compartment 20 thereof, the interior noises can be favorably absorbed by the rear layer 60 on the bases of the synergic action of the basis weight and the Young's modulus of the PET felt for the front layer.

Also, even if the interior noises are transmitted through the rear layer 60, a portion of the interior noises which are transmitted as is described above can be absorbed by being transmitted through a large number of the small holes of the inner layer 50 under the thinness of the inner layer 50. Herein, the above-described portion of the interior noises can be absorbed by being favorably transmitted through all the large number of the small holes of the inner layer 50, because a large number of the small holes are uniformly formed on the entire surface of the inner layer 50 at the above-described uniform opening rate 2(%).

And also, even if there remains a portion of the interior noises which is not absorbed by the inner layer 50, such a portion of the interior noises can be favorably absorbed by the front layer 40 on the bases of the synergic action of the basis weight and the Young's modulus of the PET felt for the front layer.

Thus, the interior noises can be favorably absorbed by the dashboard insulator without reflection thereof to the inside of the compartment by way of the above-mentioned sound absorption process.

On the other hand, even if engine noises are generated in the engine room 10, the engine noises can be favorably absorbed by the front layer 40 on the bases of the synergic action of the basis weight and the Young's modulus of the PET felt for the front layer. Herein, even if a portion of the engine noises tends to be partially transmitted at its partial noises through a large number of the small holes of the inner layer 50 when the engine noises are transmitted at its portion through the front layer 40, the partial noises of the engine noises having such tendency can be favorably absorbed by the rear layer 60 on the bases of the synergic action of the basis weight and the Young's modulus of the PET felt for the rear layer. Therefore, the engine noises can be favorably insulated by the dashboard insulator DI without propagating into the compartment 20.

According to the above-mentioned descriptions, it is capable of provision of the dashboard insulator for a motor vehicle which can favorably insulate the engine noises from the vehicle compartment and favorably absorb noises which are generated in the compartment 20 due to propagation into the compartment thereof. In addition, the basis weight of the PET felt for the front layer forming the front layer 40 is 1000 $(g/m^2)$, and the basis weight of the PET felt for the rear layer forming the rear layer 60 is 400 $(g/m^2)$. Thus, the outer layers, that is, the front layer 40 and the rear layer 60 are extremely light in weight at their weights. Moreover, the inner layer 50 is formed thinly as is described above. Therefore, the dashboard insulator DI is extremely maintained to be light in weight. Thus, it is helpful to improvement of fuel efficiency of the motor vehicle or the like, in case of adopting the dashboard insulator DI.

By the way, The dashboard insulator DI described in the present embodiment is made a working Example 1 and the other working Examples 2 to 4 are prepared. And delamination properties or peel properties of these working Examples were examined by a delamination test or peeling test. Herein, the working Examples 2 to 4 have respectively the same construction as that of the working Example 1, and each forming material of front and rear layers of the working Example 2 is the same as each forming material of the front and rear layers of the working Example 1, except that it has Young's modulus of 140,000 $(N/m^2)$ differing from each Young's modulus of each forming material of the front and rear layers of the working Example 1

Each forming material of front and rear layers of the working Example 3 is the same as Each forming material of the front and rear layers of the working Example 1, except that it has a Young's modulus of 60,000 $(N/m^2)$, differing from each Young's modulus of the front and rear layers of the working Example 1.

Also, each forming material of front and rear layers of the working Example 4 is the same as each forming material of the front and rear layers of the working Example 1, except that it has a Young's modulus of 20,000 $(N/m^2)$, differing from the Young's modulus of each forming material of the front and rear layers of the working Example 1. In addition, the delamination test refers to a test for manually delaminating or peeling the front layer or the rear layer of each of the above-mentioned working Examples from the inner layer.

Then, the peeling test was performed for each of the working Examples 1 to 4. With this peeling test, and it was found out that a peel strength from the inner layer of the front layer is approximately 15 (N/5 cm) and that a peel strength from the inner layer of the rear layer is approximately 10 (N/5 cm).

Also, sound absorption properties and sound insulation properties of the working Examples 1 to 4 were examined in comparison with a comparative Example. Herein, the comparative Example has a construction as a conventional product in which the inner layer is excluded, differing from the working Example 1. Therefore, the comparative Example is constructed by laminating a front layer (hereinafter referred to as a front layer for the comparative Example) and a rear layer (hereinafter referred to as a rear layer for the comparative Example) corresponding respectively to the front layer 40 and the rear layer 60 of the working Example 1.

And also, the front layer for the comparative Example and the rear layer for the comparative Example are formed by felt which is made of polyethyleneterephthalate having the basis weight 2000 $(g/m^2)$ and the Young's modulus 30,000 $(N/m^2)$, and each thickness of the front layer for the comparative Example and the rear layer for the comparative Example are 20 (mm) and 3 (mm) respectively. In addition, the above comparative Example has the same construction as a single layer construction structured by a lamination body of the front layer for the comparative Example and the rear layer for the comparative Example.

As a test method for sound absorption properties, a so-called reverberation chamber sound absorbing coefficient test is adopted. And as a test method for sound insulation properties, a so-called transmission sound loss test is adopted. Herein, the reverberation chamber sound absorbing coefficient test is a test in which a sound absorbing coefficient or an acoustic absorptivity of noises from the engine E (namely, engine noises) and the other noises which are absorbed by each of the working Examples 1 to 4 or the comparative Example is measured in a relationship with change of a frequency of the engine noises and the other noises.

Also, the transmission sound loss test is a test in which a transmission sound loss of engine noises and the other noises which are transmitted through each of the working Examples 1 to 4 or the comparative Example is measured in a relationship with change of a frequency of the engine noises and the other noises.

Figure 4:
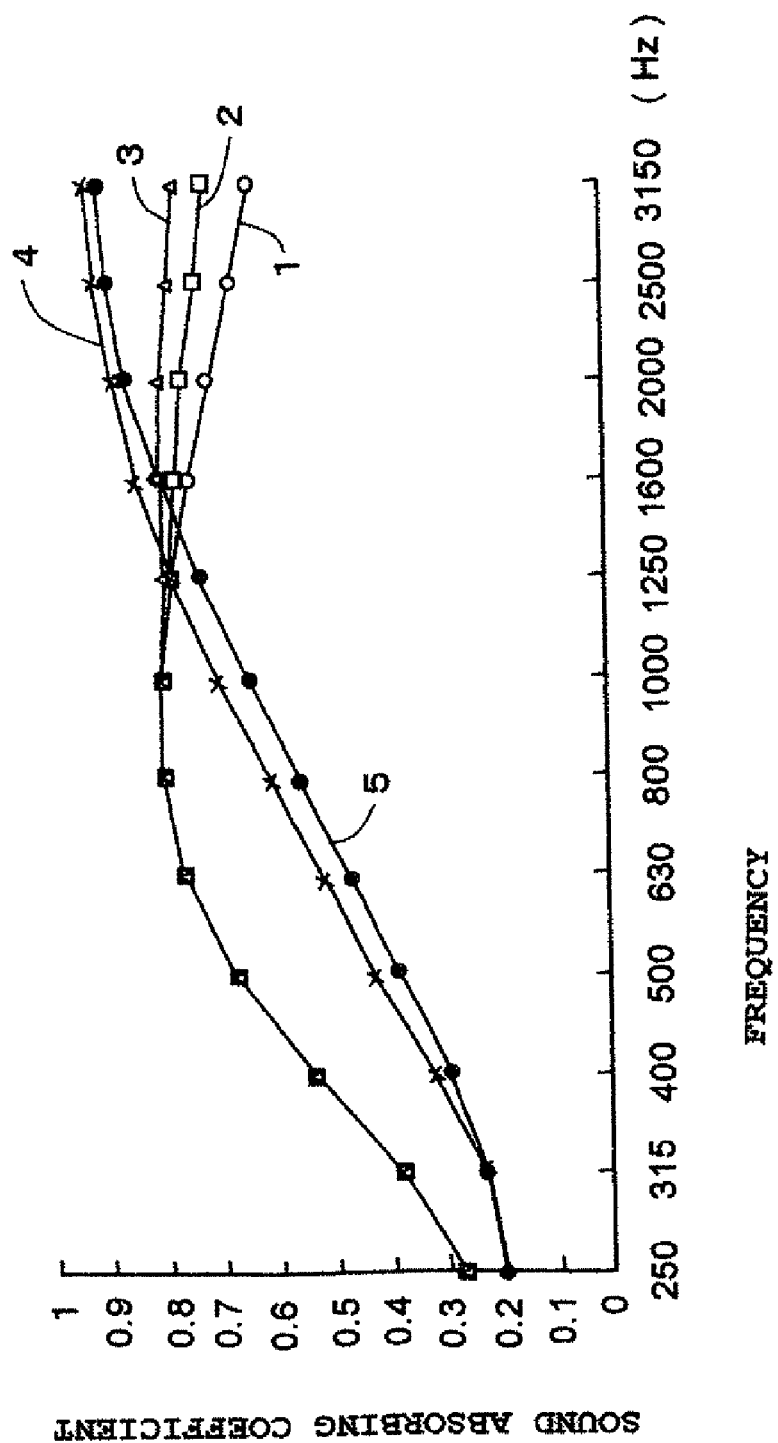
FIG. 4 is graphs respectively illustrating a relationship between a sound absorbing coefficient and a frequency of each of working examples 1 to 4 and a comparative example in the embodiment.

On the basis of the above premises, the reverberation chamber sound absorbing coefficient test was performed for each of the working Examples 1 to 4 and comparative Example. According to this test, a result as is shown in FIG. 4 was obtained. In FIG. 4, each of the graphs 1 to 4 indicates a relationship between a sound absorbing coefficient of each of the working Examples 1 to 4 and a frequency, and a graph 5 indicates a relationship between a sound absorbing coefficient of the comparative Example and the frequency.

Herein, when attempting to compare the graphs 1 to 4 with each other, the sound absorbing coefficient ranges over around 800 (Hz) in the form of an increasing tendency according to a change of the frequency in each of the graphs 1 to 3. Also, in the graph 4, the sound absorbing coefficient changes in the form of an increasing tendency in accordance with the change of the frequency. On the other hand, in the graph 5, the sound absorbing coefficient changes so as to become an increasing tendency along the graph 4 in accordance with the change of the frequency.

When attempting to contrast in this way, it is understood that the sound absorption property (shown in the graph 4) of the working Example 4 coincides or agrees substantially with the sound absorption property (shown in the graph 5) of the comparative Example. In other words, it is understood that the working Example 4 can absorb favorably noises in the vehicle compartment similarly to the conventional product, though the working Example 4 is light in weight more than the comparative Example.

Also, in each sound absorption property (shown in each of the graphs 1 to 3) of the working Examples 1 to 3, it is understood that though the sound absorbing coefficient is somewhat smaller than each sound absorbing coefficient of the working Example 4 and comparative Example in a range of about 1250 (Hz) or above, the sound absorbing coefficient is larger than each sound absorbing coefficient of the working Example 4 and comparative Example in a range of less than about 1250 (Hz). In other words, it is understood that each of the working Examples 1 to 3 can favorably absorb noises in the vehicle compartment similarly to the conventional product, though each of the working Examples 1 to 3 is light in weight more than the comparative Example.

Figure 5:
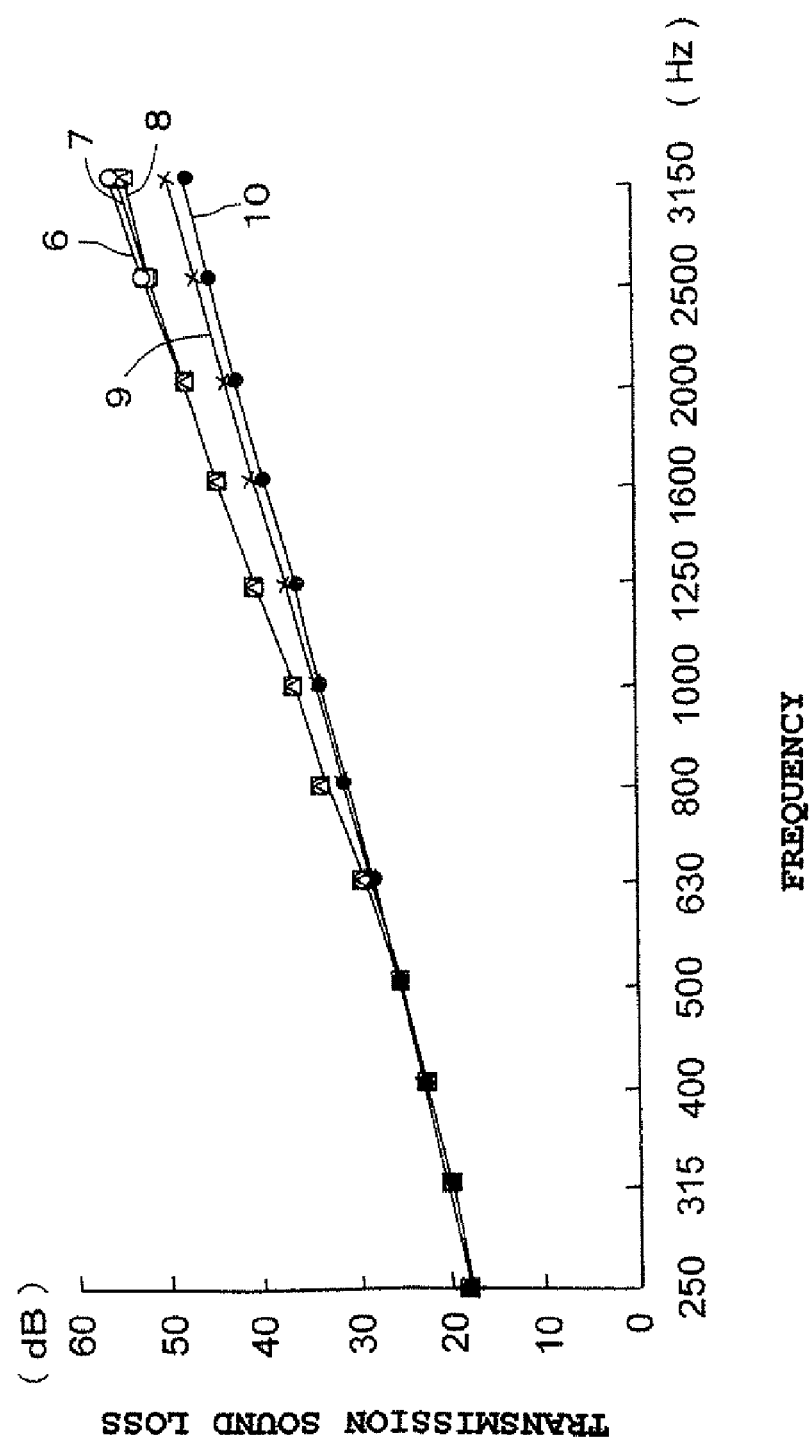
FIG. 5 is graphs respectively illustrating a relationship between transmission sound loss and a frequency of each of the working examples 1 to 4 and the comparative example in the embodiment.

Also, under the above-described premises, the transmission sound loss test was performed for each of the working Examples 1 to 4 and comparative Example. According to this test, a result as is shown in FIG. 5 was obtained. Herein, in FIG. 5, each of graphs 6 to 9 indicates a relationship between the transmission sound loss of each of the working Examples 1 to 4 and a frequency, and a graph 10 indicates a relationship between the transmission sound loss of the comparative Example and a frequency.

Then, when attempting to compare the graphs 6 to 9 with each other, the respective transmission sound losses in the graphs 6 to 8 increase at a linear tendency according to increase of the frequency as coinciding approximately with each other. In the graph 9, the transmission sound loss increases with a linear tendency according to increase of the frequency at a value which is smaller than each transmission sound loss in the graphs 6 to 8. Also, in the graph 10, the transmission sound loss changes along the graph 9 in accordance with increase of the frequency.

When attempting to contrast in this way, it is understood that the sound insulation property (shown in the graph 9) of the working Example 4 coincides substantially with the sound insulation property of the comparative Example. In other words, it is understood that the working Example 4 can favorably insulate engine noises similarly to the conventional product, though the working Example 4 is light in weight more than the comparative Example.

And, in each sound insulation property (shown in each of the graphs 6 to 8) of the working Examples 6 to 8, it is understood that the transmission sound loss has a tendency which increases more than the transmission sound loss of the sound insulation property of the working Example 4 or the comparative Example according to increase of the frequency. Therefore, it is understood that each of the working Examples 1 to 3 can insulate engine noises more favorably than the working Example 4 or the comparative Example.

Moreover, many working examples were prepared in addition to the above working Examples. Herein, these many working examples have respectively a three-layered structure formed by a front layer, an inner layer and a rear layer, similarly to each of the above working Examples. However, the basis weight and the Young's modulus of each forming material of the front layer and the rear layer are not only different respectively from the basis weight and the Young's modulus of each of the above working Examples but also different mutually at each of the above many working Examples. Also, the inner layer is a single layer, and a thickness, a fusion force, a diameter and opening pitch of each small hole are different mutually at the above many working Examples.

Then, the above-described delamination test, the reverberation chamber sound absorption properties test, and the transmission sound loss test were performed for each of the many working Examples. As the result, it was understood that the many working Examples can ensure substantially the same sound absorption property and sound insulation property as those of the above-mentioned working Example, if each of the many working Examples satisfies the following conditions 1 to 4.

1. In each inner layer of the many working Examples, the uniform opening rate of the small holes is maintained within a range of 0.05(%) to 5(%). In other words, the diameter of each of the small holes is maintained to be a value within a range of 0.05 (mm) to 5 (mm), and the opening pitch of the small holes is maintained to be a value within a range of 3 (mm) to 30 (mm).

Herein, with the small holes of the opening rate less than 0.05(%), the sound absorption property of the inner layer is insufficient. On the other hand, with the small holes of the opening rate which is larger than the opening rate 5(%), the sound insulation property is insufficient.

2. The inner layer has a thickness within a range of 25 (μm) to 80 (μm). Herein, with the thickness less than 25 (μm), the inner layer is easily broken and not practical. On the other hand, with the inner layer of the thickness which is thicker than 80 (μm), it is too thick, and the sound absorption property is insufficient.

3. Each forming material of the front layer and the rear layer has a basis weight within a range of 100 (g/m$^2$) to 1,600 (g/m$^2$) and a Young's modulus within a range of 50,000 (N/m$^2$) to 300,000 (N/m$^2$).

Herein, with the basis weight less than 100 (g/m$^2$), each sound absorption property of the front layer 40 and the rear layer 60 is insufficient. On the other hand, the basis weight larger than 1,600 (g/m$^2$) is not preferable from the viewpoint of weight reduction of the dashboard insulator.

Also, with the Young's modulus less than 50,000 (N/m$^2$), the front layer and the rear layer are too flexible, and thus lack in utility. On the other hand, with the Young's modulus larger than 300,000 (N/m$^2$), the front layer and the rear layer are too hard, and thus lack in utility and is insufficient in sound absorption property thereof.

4. The fusion part by the one side fusion film between the front layer and the barrier film has a fusion force within a range of 5 (N/5 cm) to 20 (N/5 cm) at its portion equal to or more than 50(%), and the fusion part by the other side fusion film between the rear layer and the barrier film has a fusion force within a range of 5 (N/5 cm) to 20 (N/5 cm) at its portion equal to or more than 50(%).

Herein, with the portion of the fusion part less than 50(%) a sound absorption property as each of the front layer and the rear layer is insufficient. On the other hand, with the fusion force less than 5 (N/5 cm), the front layer and the rear layer can easily delaminate from the inner layer. Also, with the fusion force larger than 20 (N/5 cm), the sound absorption property as each of the front layer and the rear layer is insufficient and thus is not preferable.

In addition, the following various modifications may be given for embodying the present invention without being limited to the above-mentioned embodiment.

(1) In the inner layer 50, the forming material of the barrier film is not limited to nylon but may be any resin such as a polyester film or the like. Also, each forming material of the first and second fusion films may be a thermoplastic resin such as, for example, polyethylene, polypropylene, polyethyleneterephthalate or unsaturated polyester having a melting point (the melting point 200(° C.)) which is lower than that of the forming material of the barrier film.

(2) The forming material of the front layer 40 or the rear layer 60 may be a fibrous structural body material such as felt, glass wool or the like or a porous synthetic resin material such as urethane foam or the like without being limited to that described in the above-mentioned embodiment. In addition, the fibrous structural body material may also be felt made of cotton or wool without being limited to the felt made of polyethyleneterephthalate.

(3) It is only necessary that the forming material of the front layer 40 has a basis weight within the range of 100 (g/m$^2$) to 1,600 (g/m$^2$), differing from that described in the above-mentioned embodiment.

(4) In the inner layer 50, it is only necessary that each forming material of the one side fusion film 50a and the other side fusion film 50c has a melting point lower than that of the forming material of the barrier film 50b. And each forming material of the one side fusion film 50a and the other side fusion film 50c may be respectively a thermoplastic resin material different from each other.

(5) For manufacture of the above-described dashboard insulator DI, after preparing a sheet-state polyethylene for the one side fusion film, a sheet-state nylon for the barrier film and a sheet-state polyethylene for the other side fusion film are prepared in advance, respectively, the above-described single sheet-like film may be formed by sandwiching and laminating the sheet-state nylon for the barrier film between the sheet-state polyethylene for the one side fusion film and the sheet-state polyethylene for the other side fusion film, differing from the above-described embodiment.

(6) Noises to the dashboard insulator DI may include various noises entering the engine room without being limited to engine noises.

| | |
|---|---|
| 40 | a front layer |
| 50 | an inner layer |
| 50a | one side fusion film |
| 50b | a barrier film |
| 50c | the other side fusion film |
| 60 | a rear layer |
| DI | a dashboard insulator |

What is claimed is:

1. A dashboard insulator for a motor vehicle, comprising:
a first outer layer;
an inner layer laminated on said first outer layer; and
a second outer layer laminated on said inner layer on the opposite side of the inner layer from the first outer layer;
wherein one of the outer layers is formed by a porous material having a basis weight within a range of 100 $(g/m^2)$ to 1,600 $(g/m^2)$,
wherein the other outer later is formed by porous material having a basis weight within a range of 100 $(g/m^2)$ to 1,600 $(g/m^2)$ and Young's modulus within a range of 50,000 $(N/m^2)$ to 300,000 $(N/m^2)$;
wherein said inner layer is formed by a film lamination body having a thickness within a range of 25 ($\mu$m) to 80 ($\mu$m), and including a barrier film, a first fusion film laminated between said barrier film and said first outer layer to be fused to said barrier film and said first outer layer, and a second fusion film laminated between said barrier film and said second outer layer to be fused to said barrier film and said second outer layer;
wherein said film lamination body includes a plurality of small holes formed penetratingly into said film lamination body at a uniform opening rate within a range of 0.5(%) to 5(%); and
wherein a fusion part of said first fusion film with each of said first outer layer and said barrier film has a fusion force within a range of 5 (N/5 cm) to 20 (N/5 cm) at its portion equal to or more than 50(%); and
a fusion part of said second fusion film with each of said second outer layer and said barrier film has a fusion force within a range of 5 (N/5 cm) to 20 (N/5 cm) at its portion equal to or more than 50(%).

2. The dashboard insulator for a motor vehicle according to claim 1,
wherein the porous material forming each of said first and second outer layers is a fibrous structure body material or a porous synthetic resin material; and
wherein said barrier film of said inner layer is formed by a thermoplastic resin material;
said first and second fusion films of said inner layer are respectively formed by a thermoplastic resin material with a melting point lower than that of the thermoplastic resin material forming said barrier film.

3. The dashboard insulator for a motor vehicle according to claim 2,
wherein the fibrous structure body material forming each of said first and second outer layers is felt made of polyethyleneterephthalate, cotton or wool; and
wherein the thermoplastic resin material forming said barrier film is nylon or polyester;
the thermoplastic resin material forming each of said first and second fusion films is polyethylene or polypropylene.

4. A manufacturing method of a dashboard insulator for a motor vehicle, comprising the steps of:
an outer layer forming step for forming one of first and second outer layers by a porous material having a basis weight within a range of 100 $(g/m^2)$ to 1,600 $(g/m^2)$ and forming the other of said first and second outer layers by a porous material having a basis weight within a range of 100 $(g/m^2)$ to 1,600 $(g/m^2)$ and Young's modulus within a range of 50,000 $(N/m^2)$ to 300,000 $(N/m^2)$;
an inner layer forming step for forming a first cylindrical film for a barrier film, a second cylindrical film for a first fusion film containing said first cylindrical film and a third cylindrical film for a second fusion film contained by said first cylindrical film respectively by a first thermoplastic resin material in a molten state, a second thermoplastic resin material in a molten state and with a melting point lower than that of the first thermoplastic resin material and a third thermoplastic resin material in a molten state and with a melting point lower than that of the first thermoplastic resin material by using a multi-layer inflation molding machine,
thereafter cooling and bonding said second, first and third cylindrical films to form a single cylindrical film of a thickness within a range of 25 ($\mu$m) to 80 ($\mu$m), forming a sheet-like film from said single cylindrical film, and forming a plurality of small holes to said sheet-like film at a uniform opening rate within a range of 0.5(%) to 5(%) thereby to form said inner layer constructed by said first fusion film, said barrier film and said second fusion film as a film lamination body; and
a fusion step for interposing said film lamination body between said first and second outer layers in a laminated state to constitute a three-layered body, and
heating said three-layered layer-body at a temperature between the melting point of the first thermoplastic material and each melting point of the second and third thermoplastic materials so that said first and second fusion films are melted and pressurized and thereafter are cooled so as to fuse said first and second outer layers to said barrier film through one of said first and second fusion films and also to fuse said second outer layer to said barrier film through the other of said first and second fusion films,
wherein for fusing said first and second outer layers to said barrier film through one of said first and second fusion films and also for fusing said second outer layer to said barrier film through the other of said first and second fusion films in the fusion step, said pressurization is performed so that a fusion part of said first fusion film with each of said first outer layer and said barrier film has a fusion force within a range of 5 (N/5 cm) to 20 (N/5 cm), and a fusion part of said second fusion film with each of said second outer layer and said barrier film has a fusion force within a range of 5 (N/5 cm) to 20 (N/5 cm).

* * * * *